United States Patent Office 3,107,775
Patented Oct. 22, 1963

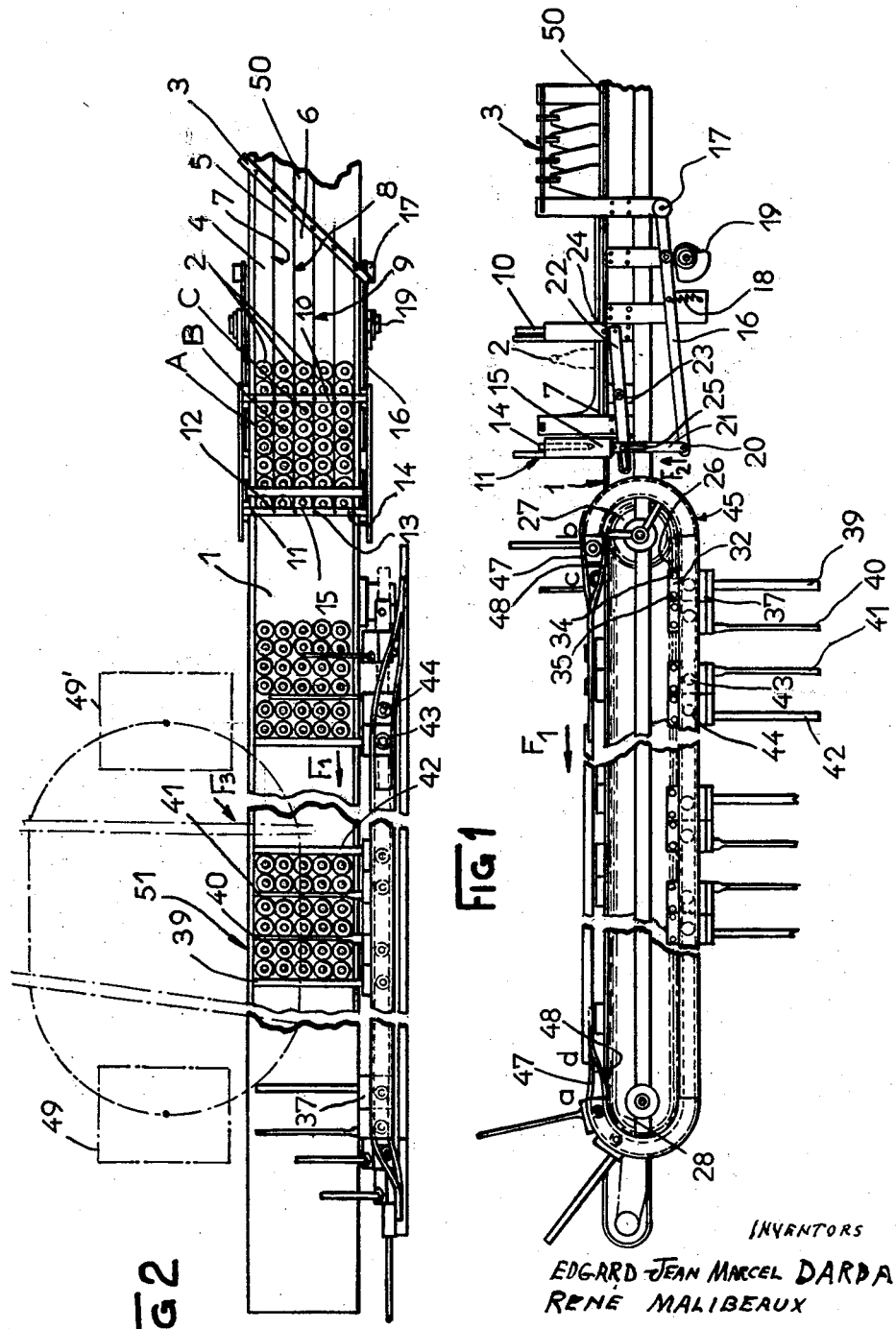

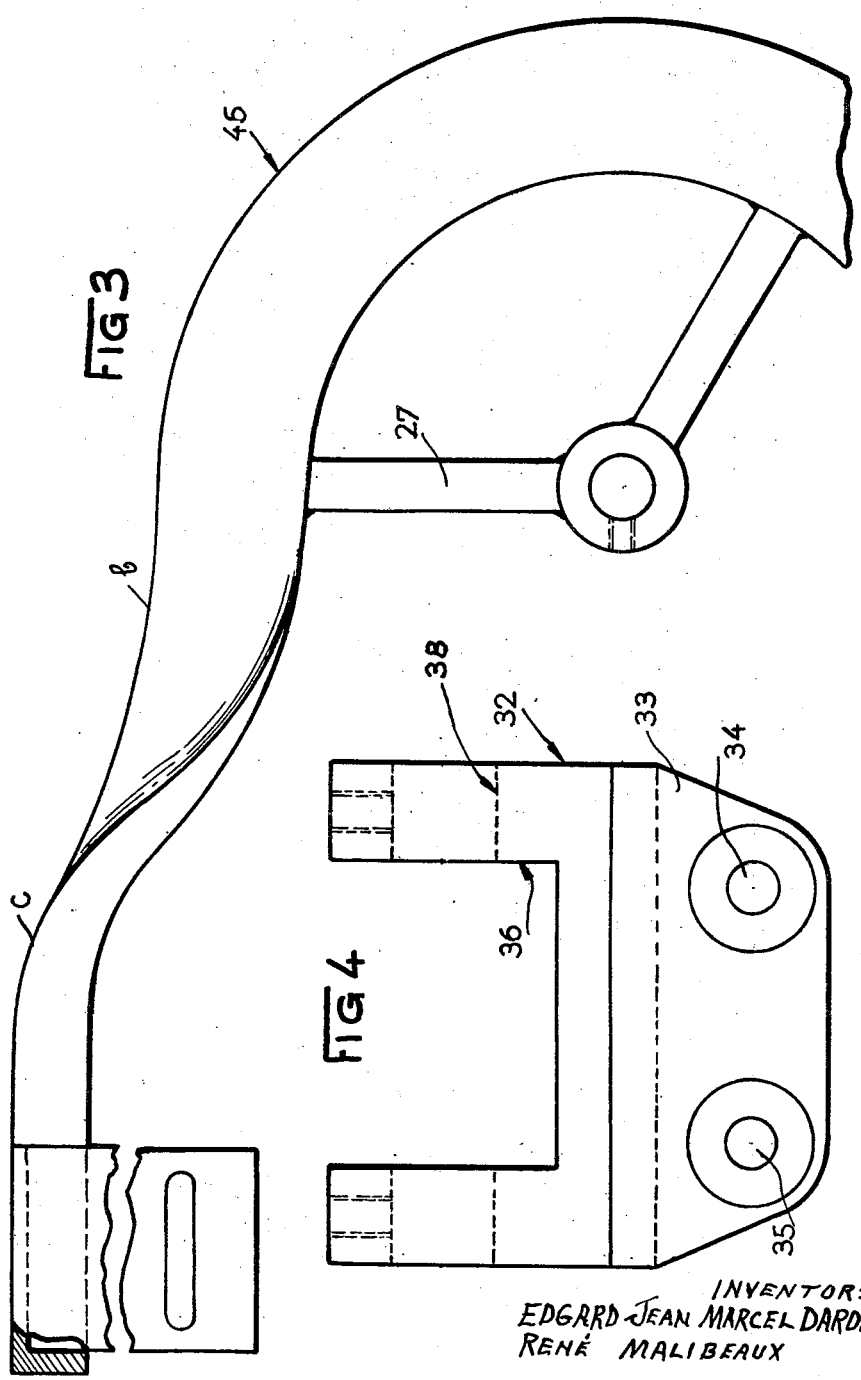

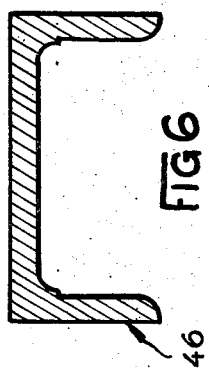
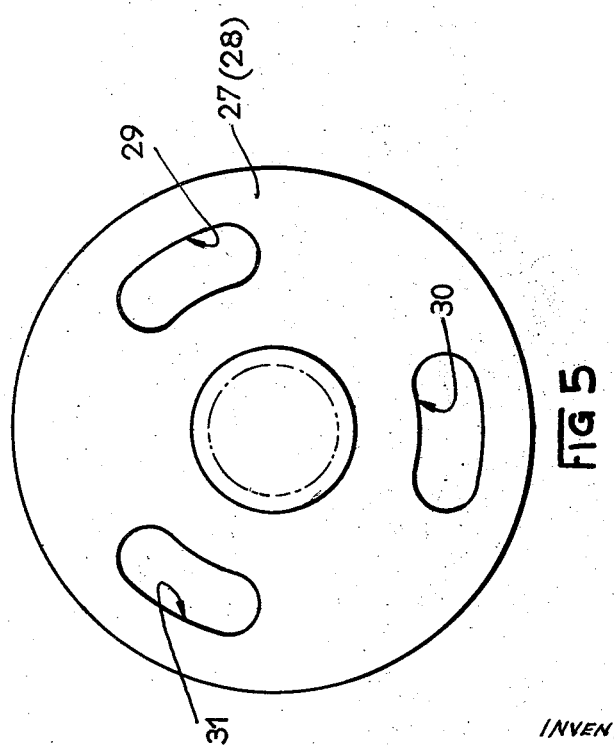

3,107,775
DEVICE FOR GROUPING MISCELLANEOUS OBJECTS
Edgard Jean Marcel Dardaine, Poissy, and René Malibeaux, Paris, France, assignors to E. P. Remy & Cie, Poissy, France, a French body corporate
Filed Dec. 8, 1960, Ser. No. 74,729
Claims priority, application France Mar. 17, 1960
10 Claims. (Cl. 198—34)

It is an essential object of the present invention to provide a method of assembling or grouping miscellaneous objects or articles such as bottles, boxes, packages etc. in predetermined rows with a view to cause these objects to be seized and transferred in a predetermined order by a suitable gripping device.

It is known that in automatic installations for positioning miscellaneous articles or products in cases or crates of standard dimensions, for example in the handling and packing of empty or filled bottles, machines are used which comprise gripping heads grouped to form blocks or units as a function of the space and position to be occupied by these bottles or the like in the case or crate. As a rule, these articles are aligned, in the crate, in two perpendicular directions and therefore they must be fed to the gripping apparatus in a predetermined order corresponding strictly to the positions to be occupied by these bottles or the like in the case or crate. Although it is a simple matter, in machines comprising conveyor belts on which the objects to be grouped are transported, to align these objects in the longitudinal direction, for example by forming adequate channels or the like guide means along the conveyor, it is on the other hand very difficult and awkward to align these articles with a sufficient precision in a direction at right angles to the direction of movement of the conveyor belt. Moreover, it may be noted that when at a given location of the conveyor belt a block comprising a predetermined number of objects to be grouped and transported is formed, the movement of the conveyor belt is most likely to interfere with the proper alignment of the thus formed row during the movement of this group toward the gripping apparatus. As a result, when the gripping apparatus becomes operative the different gripping heads thereof or at least some of them are somewhat shifted in relation to the necks of certain bottles or the like. Obviously, the gripping and transfer of these objects are disturbed by this inconvenience and therefore the hitherto known machines of this character cannot be considered as operating regularly, uniformly and therefore in a reliable manner.

It is an essential object of the present invention to avoid the various drawbacks set forth hereinabove.

In its broadest aspect, this invention provides a method of grouping articles which is remarkable notably in that it consists in causing this grouping action to be produced by means of rocking rods or bars engaging the gaps or interstices between the articles to be grouped so as to constitute a kind of regulating frame, if necessary, while compelling these articles to constitute regularly aligned rows.

According to another feature of this invention, the positioning rods or bars are left in the aforesaid gaps until the gripping device has seized the articles.

According to another feature characterizing this invention the aforesaid rods are caused to tilt from a substantially vertical position to a substantially horizontal position in which they fit in said gaps between the aforesaid objects, and vice versa.

It will be readily understood that with the method of this invention—which is applicable not only to objects transported on a conveyor belt but also to objects transported in any other manner—a positive alignment of the rows of objects is obtained, these objects being guided by the aforesaid rods, and in addition these rods are removed from the group of objects only after the latter have been seized by the gripping device. Thus, it will be seen that with this invention the positive alignment of the objects thus obtained cannot be destroyed irrespective of the form of displacement applied thereto.

It is another object of this invention to provide a device for carrying out the method broadly set forth hereinabove, which is remarkable notably in that it comprises tilting rods or bars adapted to engage the gaps between the objects to be grouped or aligned so as to form therearound a kind of positioning frame, if necessary.

According to a further feature characterizing this invention the mechanism controlling the tilting movements of said positioning rods is adapted to restore the latter from their substantially horizontal position to their substantially vertical position when the objects have been seized by the gripping device.

If the articles or objects are carried by a conveyor belt or the like the bars are caused to rock in a plane at right angles to the direction of travel of the conveyor belt.

In this case, the aforesaid bars are disposed laterally in relation to the conveyor belt, on one or both sides thereof, and a movement of translation identical and parallel with that of the conveyor belt is impressed thereto.

According to a further feature characterizing this invention and in order to group or assemble the articles or objects by blocks or units comprising a predetermined number of aligned rows of these articles or objects, the device comprises above the conveyor belt and rearwardly of the aligning rods a pair of retractable barriers or harrows of which the relative spacing corresponds to the desired number of aligned rows, the remotest one of said barriers or harrows being firstly retracted while the other barrier or harrow (the nearest to the gripping device) is closed, so as to permit the desired accumulation of the objects to be grouped between the two barriers or harrows, whereafter the first barrier is retracted and the second barrier closed to permit the discharge of the objects or articles thus assembled while stopping the untimely or undesired delivery of other objects.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawings, in which:

FIGURE 1 illustrates in diagrammatical elevational view a device constructed according to the teachings of this invention;

FIGURE 2 is a plan view of the device shown in FIG. 1;

FIGURE 3 is a detail view showing on a larger scale a cam or ramp controlling the tilting of the aligning rods;

FIGURE 4 shows on a larger scale another detail of the mounting of these bars;

FIGURE 5 shows also on a larger scale the mounting of an endless chain conveyor equipped with the aligning rods of this invention, and FIGURE 6 is a detail view showing on a larger scale the section of the ramp controlling the tilting of the aligning rods.

In the form of embodiment illustrated by way of example in the drawings the device is shown as comprising a conveyor belt 1 for delivering objects 2 to be grouped. Overlying the belt 1 is a guide member 3 adapted to prevent the objects from diverting from their normal path, according to the well-known procedure. Similarly, channels 4, 5, 6 consisting of sections 7, 8, 9 disposed in the longitudinal direction—that is, in the direction of travel of the conveyor belt 1—may also be provided. By these means the objects 2 are properly aligned in the longitudinal direction, so that parallel rows A, B, C for example may be formed as shown in FIG. 2.

The reference numeral 10 designates a first barrier or harrow of which the rods are shown diagrammatically at 11, 12, 13. The relative spacing between any pair of adjacent rods for example 11 and 12 is slightly inferior to the diameter or width of the objects 2 so as to prevent these objects from passing through the harrow. Similarly, these rods are so disposed that they fit inbetween these objects 2, that is, in the gaps left between any assembly of four adjacent objects. Thus, these objects are protected against any undesired rubbing or frictional contact with the rods which might damage the labels carried by the objects, or the objects themselves.

Ahead of the harrow 10 is another harrow 14 secured for example on a support or bracket 15. This second harrow is identical with the first harrow 10 and is actuated in synchronism therewith by means of a device to be described hereafter. In its lower portion the apparatus comprises for example an arm 16 pivoted at 17 on a fixed pivot pin, this arm being urged by a return spring or like member 18 and controlled by a cam 19. At its free end 20 the arm 16 is pivoted on a member 21 rigid with the harrow 14 to permit the sliding movement of this harrow in its vertical support 15. Of course, the pivotal connection 20 may comprise for example a slot to permit the vertical sliding movement of the harrow when the arm 16 is tilted. The two harrows 10 and 14 are interconnected by a link 22 pivoted at 23 and adapted to slide either in recesses 24 formed to this end in the supports of the two harrows 10 and 14, or in slots 25. The distance between the two harrows or barriers 10 and 14 is calculated to correspond to the length of the group of objects to be aligned. It may also be said that the distance between the two harrows is a function of the number of rows to be aligned in a direction at right angles to the direction of travel of the conveyor belt.

It may also be noted that, if desired, the harrows may be hingedly mounted to permit a limited tilting movement thereof about an upper horizontal axis and therefore avoid any wedging when the number of objects accumulated upstream is too great.

Ahead of the harrow 14 and laterally in relation to the conveyor belt 1 is an endless chain or belt 26 mounted on a pair of rollers 27, 28 of a shape illustrated in FIG. 5. These rollers are formed with bean-shaped openings 29, 30, 31 affording a limited play take-up, these rollers being well-known to those skilled in the art.

Secured on this chain 26 are supports 32 shown more in detail in FIG. 4. These supports may have for example the shape of a block 33 secured by a pair of rivets or bolts 34, 35 and provided with a yoke 36. Mounted in this yoke 36 are blocks 37 pivoted at 38 and having secured therein the rods 39, 40, 41, 42, etc. Due to the pivotal mounting of blocks 37 the latter may be rotated through an angle of about 90°, so that the rods 39, 40 . . . may assume a vertical position and rock to a horizontal position, and vice-versa.

Mounted on these blocks 37 are roller followers 43, 44, shafts or similar members co-acting with cams or ramps 45. In the specific form of embodiment illustrated the guide cam 45 consists of a plurality of elements. A first element disposed horizontally extends in a direction parallel to the chain and to the lower reach thereof between points $a$ and $b$. Another element also disposed horizontally extends between the points $c$ and $d$ along the upper reach of the chain.

A third element and a fourth element ensure the gradual transition between, and at the ends of, the first two elements. They are of substantially helical configuration. In other words, the ramp or cam 45 is firstly vertical, as shown in the lower portion of FIG. 1, and slopes down gradually along a helical path (as shown more in detail in FIG. 3), this helical bending disappearing subsequently so that the ramp assumes a horizontal position along the entire portion of the device and practically up to the vicinity of the opposite end of the endless chain, and at the end of this ramp portion another helical portion gradually merges into a vertical ramp. That portion of ramp 45 which extends vertically and horizontally may consist if desired of a channel section 46 (see FIG. 6) and the helical portions thereof may consist for example of a pair of superposed rails 47 and 48.

Of course, the number of rods and supports to be mounted on the chain 26 depends essentially on the desired number of rows to be obtained and on the selected rate of feed of the conveyor belt. In the example illustrated it is assumed that the problem consists in disposing thirty bottles in a crate provided with two inner partitions, that is, providing three blocks each comprising two rows extending at right angles to the conveyor belt, and five rows extending in the other direction. Under these conditions, it is sufficient to provide four rods or bars 39, 40, 41, 42 disposed at the ends of the block thus formed and symmetrically inside this block.

The end rods 39, 42 may have any desired shape and act as framing members. On the other hand the separator rods 40 and 41 to be engaged between the objects or bottles 2 should fit in the gaps left therebetween.

The reference numeral 49 illustrates diagrammatically the gripping head of the machine which is designed for seizing the bottles or the like and placing them into a crate. This machine is described in a preceding patent application filed by the applicant, but it will be readily understood that any other apparatus may be used without the slightest inconvenience. In the example illustrated the gripping heads travel at the same speed as that of the conveyor belt in order to avoid any shifting and permit the easy gripping of the objects to be transported.

The device described hereinabove operates very simply as follows:

Assuming that the conveyor belt is travelling in the direction of the arrow $F_1$, the objects to be disposed in rows into the crates are fed at the end 50 of the conveyor belt where they are guided by channels or like guide means 4, 5 and 6. Upstream of the first harrow 10 these objects are somewhat caused to accumulate and this harrow 10 is opened while closing the other harrow 14. This is obtained by virtue of the combination of the movement of arm 16 with that of link 22. When the bottles or other objects to be grouped have been properly accumulated in the space obtaining between the two harrows, the cam 19 is actuated or more exactly allowed automatically to assume a position corresponding to an upward movement in the direction of the arrow $F_2$ of the arm 16 which raises the harrow 14 and lowers the harrow 10 due to the action of link 22. The harrow 10 will thus prevent immediately the bottles from advancing on the conveyor belt, while the opening of the harrow 14 permits of discharging the group of bottles formed between the two harrows. This group travels on the belt 1 in the direction of the arrow $F_1$ and meanwhile the endless chain (travelling at the same speed as the conveyor belt) brings a set of aligning rods or bars 39, 40, 41 and 42. The supports of these rods which pass through or are guided by the helical portion $b$, $c$ of the ramp 45 are gradually lowered from their vertical position to their horizontal position and placed between the lateral rows of bottles constituting the aforesaid separate block. Of course, any one of the means known in the field may be used for ensuring a perfect synchronism between the moment when the group of bottles approaches the helical ramp and that when the set of rods is also approaching this ramp. The rods, by inserting themselves between the objects 2, impart the proper movements thereto in order to ensure their perfect alignment and then travel therewith until they lie beneath the gripping head having also travelled in the direction of the arrow $F_3$ from its position 49' to a position (not shown) overlying the block shown at 51. It may also be noted that when the gripping head arrives above the block 51 the rods are still in position and maintain a perfect alignment between the objects to be grouped.

This position is shown in FIG. 2, gradually, the aligning rods move to the vertical position under the control of the ramp portion $d—a$ and remain in this position along the entire length of their travel at the lower portion of the device, as illustrated in FIG. 1.

In the example selected, shown and described herein for illustrative purpose the helical ramps $b$, $c$ and $d$, a consist of two superposed rails or the like, but it will be readily understood that a cam or any other adequate device or combination of means may be used in lieu thereof without departing from the spirit and scope of the invention as set forth in the appended claims.

Of course, the cam 19 controlling the relative movements of the two harrows 10 and 14 may be actuated automatically, if desired, and adjusted in such a manner that the delivery of the objects to be grouped is continuous as well as the movements of the two harrows. Devices of this character are well known in the art and obviously do not require any detailed description.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

What we claim is:

1. A device for positioning in predetermined rows miscellaneous objects such as bottles, cases and the like, comprising a gripping device, conveying means on which said objects are disposable in order to have them seized by said gripping device, supporting means movable in parallel relationship to said conveying means and mounted laterally thereof, a series of tilting elements carried by said supporting means and engageable inbetween said objects and a grouping device including at least a pair of retractable harrows, the distance between two successive harrows corresponding to the length of the desired number of rows of said objects intended to be aligned, the said harrows being disposed above said conveying means and adjacent an end thereof and control means for actuating each of said harrows, the harrow which is the furthest from the said end of said conveying means being first retracted when the other harrow is closed to stop the progression of the objects on the conveying means, whereafter the said furthest harrow is closed, and the other harrow opened to admit the objects which have been accumulated therebetween to the gripping device in the form of a compact block.

2. A device according to claim 1 wherein cam means synchronize the movements of said two harrows.

3. A device according to claim 1 wherein said harrows extend perpendicularly to said conveying means.

4. A device according to claim 1 wherein the distance separating two adjacent rods of said harrows is smaller than the width of the said objects.

5. A device for grouping miscellaneous objects, such as bottles, boxes and the like comprising a gripping device, a conveyor belt onto which said objects are disposable in predetermined rows while said conveyor belt is travelling at a constant speed with a view of having them seized and transported in a predetermined spacial relationship by said gripping device and a grouping device disposed upstream of said gripping device, said grouping device comprising at least a retractable inlet harrow and a retractable outlet harrow, said grouping device being provided to accumulate a predetermined number of objects and to intermittently liberate said objects, a series of tilting bars disposed downstream of said grouping device and engageable inbetween the said objects, the travelling speed of said bars being the same as the travelling speed of said conveyor belt, and control means to operate said bars, said control means being active to actuate said bars in synchronism with said grouping device and said conveyor belt.

6. A device according to claim 5 wherein cam means synchronize the movements of said inlet harrow and said outlet harrow so that first the inlet harrow is raised whereas the outlet harrow is lowered to permit the desired accumulation of objects to be grouped between the two harrows, then the two harrows are lowered and third, the outlet harrow is raised to permit the discharge of the objects thus accumulated whereas the inlet harrow stops undesired delivery of other objects.

7. A device according to claim 5 including an endless travelling chain disposed laterally in relation to said conveyor belt and supports for said bars, and wherein said bars are pivotally mounted on supports secured to said chain, said bars being adapted for rocking from a substantially vertical inoperative position to a substantially horizontal position in which they fit between the objects to be grouped and run beneath said grouping device.

8. A device according to claim 7 comprising ramp means to operate said bars as they are moved by said chain, said ramp means having a vertical portion in the form of a channel section disposed edgewise and corresponding to the path followed by said bars in said vertical position, a horizontal portion in the form of a channel section but disposed upside down and corresponding to the path followed by said bars in said horizontal position, and helical portions consisting of superposed rails which ensure a pronounced transition between said horizontal and vertical positions.

9. A device according to claim 5 further comprising aligned guide channels disposed above said conveyor belt for causing the objects to advance regularly in the longitudinal direction toward said gripping device.

10. A device according to claim 9 wherein said guide channels extend over the surface of said conveyor belt from the position where the objects are deposited thereon to the position where said gripping device is located and operates.

References Cited in the file of this patent

UNITED STATES PATENTS 2,358,447    Creamer _____ Sept. 19, 1944
2,920,742    Lingg _____ Jan. 12, 1960